United States Patent
Nurenberg et al.

(10) Patent No.: US 6,181,697 B1
(45) Date of Patent: Jan. 30, 2001

(54) METHOD FOR A UNICAST ENDPOINT CLIENT TO ACCESS A MULTICAST INTERNET PROTOCOL (IP) SESSION AND TO SERVE AS A REDISTRIBUTOR OF SUCH SESSION

(75) Inventors: Steven Howard Nurenberg, Manalapan; David Hilton Shur, Middletown; Aleksandr Zelezniak, Matawan, all of NJ (US)

(73) Assignee: AT&T Corp., New York, NY (US)

( * ) Notice: Under 35 U.S.C. 154(b), the term of this patent shall be extended for 0 days.

(21) Appl. No.: 09/052,028

(22) Filed: Mar. 31, 1998

(51) Int. Cl.[7] .......................... H04L 12/56; G06F 15/16; H04J 3/26

(52) U.S. Cl. .......................... 370/390; 370/392; 370/432; 370/401; 709/203; 709/238

(58) Field of Search .................................... 370/389, 390, 370/262, 401, 432, 352, 354, 353, 355, 356, 383, 392, 408, 410; 709/201, 203, 238, 227, 228

(56) References Cited

U.S. PATENT DOCUMENTS

| | | | |
|---|---|---|---|
| 5,581,552 | * 12/1996 | Civanlar et al. | 370/401 |
| 5,905,872 | * 5/1999 | De Simone et al. | 370/401 |
| 6,011,782 | * 1/2000 | De Simone et al. | 370/260 |

OTHER PUBLICATIONS

George C. Sackett & Christopher Y. Metz, "ATM and Multiprotocol Networking" CH13 'LAN Emulation & MPGA' pp. 267–288, 1996.*

* cited by examiner

Primary Examiner—Alpus H. Hsu
Assistant Examiner—Afsar M. Qureshi

(57) ABSTRACT

A endpoint client (111-1) on an IP Unicast network (107) that is provided access to a Multicast session on an IP Multicast network (101) through a Multicast-Unicast gateway server (MUS) (120) is enabled to re-Multicast that session to other endpoint clients (111-2) on the network to which it is connected or to endpoint clients (134, 135) on any Multicast-capable sub-network (132) to which it is directly connected. To act as a re-Multicaster, the endpoint client receiving Unicast-addressed packets from the session from the MUS, re-translates these Unicast-addressed packets to Multicast-addressed packets by translating the Unicast address in the distribution field of each packet's header into a Multicast address and overwriting the Unicast address in each header with the Multicast address. When an endpoint client on the same or connected sub-network as the re-Multicaster desires to join a session that is being re-Multicast, it needs only connect to that Multicast address. A endpoint client on a Unicast network can elect to be a re-Multicaster of packets from a session as long as that same session is not being re-Multicast by another endpoint client on any sub-network on which the electing re-Multicaster is connected or a Multicast router is not forwarding packets from the session onto the sub-network.

21 Claims, 5 Drawing Sheets

METHOD FOR A UNICAST ENDPOINT CLIENT TO ACCESS A MULTICAST INTERNET PROTOCOL (IP) SESSION AND TO SERVE AS A REDISTRIBUTOR OF SUCH SESSION

CROSS REFERENCE TO RELATED APPLICATIONS

This application describes subject matter that is also described in co-pending U.S. patent application Ser. No. 08/927,426, filed Sep. 11, 1997 and entitled "Method and System for a Unicast Endpoint Client to Access A Multicast Internet Protocol (IP) Session", and assigned to the assignee of the present application.

TECHNICAL FIELD

This invention relates to data communications, and more particularly, to providing a endpoint client on a Unicast network with the ability to access a Multicast session on an Multicast network and re-Multicast that session to other endpoint clients.

BACKGROUND OF THE INVENTION

In conventional packet, frame or cell based systems there are typically two modes of communication: point-to-point (also known as Unicast) and point-to-multipoint (also known as Multicast). Multicast addresses typically differ from Unicast addresses in that they refer to an intermediate abstraction known as a group or group address. All senders address their transmitted information to this group and all receivers are "tuned" to "listen" to that address to receive the information transmitted to that group by the senders. The senders of information are thus effectively de-coupled from the set of receivers. Senders do not need to know who the receivers are—they simply transmit packets addressed to the group. Similarly, receivers do not need to know who the senders are—they simply send a request to the network (routers) to join a specific group of interest.

Multimedia distribution and conferencing/collaboration systems are advantageously and efficiently supported by Multicast communication methods. As will be used herein, a specific Multicast communication is referred to as a session. In the prior art, it is not possible for Unicast endpoints to access Multicast sessions, due to the differences in addressing modes and receiving modes. This disadvantageously limits the ability of a user at an endpoint client connected to a Unicast network to participate in sessions in which they have interest and in which they could be an active participant.

In co-pending patent application, Ser. No. 08/927,426, filed on Sep. 11, 1997, and assigned to the present assignee hereof, which application is incorporated herein by reference, a method and a system for a endpoint client on a Unicast network to access a Multicast Intenet Protocol (IP) session is described. As described therein, inter-connectivity between a endpoint client connected to a Unicast network and one or more clients connected to a Multicast network is effected through a Multicast-Unicast Server (MUS). Such a server obtains information about sessions on the Multicast network and makes such information available to the client on the Unicast network upon request by the client. Upon being presented with a list describing the subject matter of each session, the user on the Unicast network selects the session to which he or she wants to join, which causes the Multicast-Unicast server to join the appropriate session on behalf of the requesting client for each media type for which the joining client wants to be a participant. The server then sets a bi-directional Unicast User Datagram Protocol (UDP) stream between itself and the client. All packets then received by the server from the client on the Unicast network are address-translated to the appropriate Multicast session address. In addition, all packets received by the server on the Multicast session address are address-translated and sent to the client on the Unicast network. The client on the Unicast network is then able to participate in the Multicast session as both a sender and a receiver of packets to and from other clients which are active during the session.

SUMMARY OF THE INVENTION

In accordance with the present invention, a endpoint client on a Unicast network, once enabled to access a Multicast session through a MUS, can then automatically redistribute that session by locally re-Multicasting that session to other endpoint clients on the same sub-network on the Unicast network to which it is connected or to other endpoint clients on any local Multicast-capable sub-networks to which it is directly connected. Thus, by means of the technique of re-Multicasting, these other endpoints can receive the session without independently retrieving the same session from the MUS, which could put an undue burden on the transmission facilities if a large plurality of endpoints simultaneously attempted to receive separate copies of the same data stream associated with a particular session from a MUS. In order to act as a re-Multicaster, the endpoint client on the Unicast network receiving the Unicast-addressed data packets associated with session from the MUS, re-translates these Unicast-addressed data packets to Multicast-addressed data packets by translating the Unicast address in the destination field of each packet's header into a Multicast address and overwriting the Unicast address in each header with the Multicast address. This overwriting Multicast address in the destination field of each header can be the Multicast address used by the original Multicast session, as delivered to the MUS, or it can be a new Multicast address assigned to the session on the local network.

A endpoint on the Unicast network receiving a Unicast session from the MUS can elect to be a re-Multicaster of the session as long as that session is not being re-Multicast by another endpoint on any sub-network on which the electing endpoint is connected. Further, if a Multicast router starts to forward packets from the session onto that sub-network when a re-Multicaster is already doing so, the re-Multicasting operation is halted.

DETAILED DESCRIPTION

Figure 1:
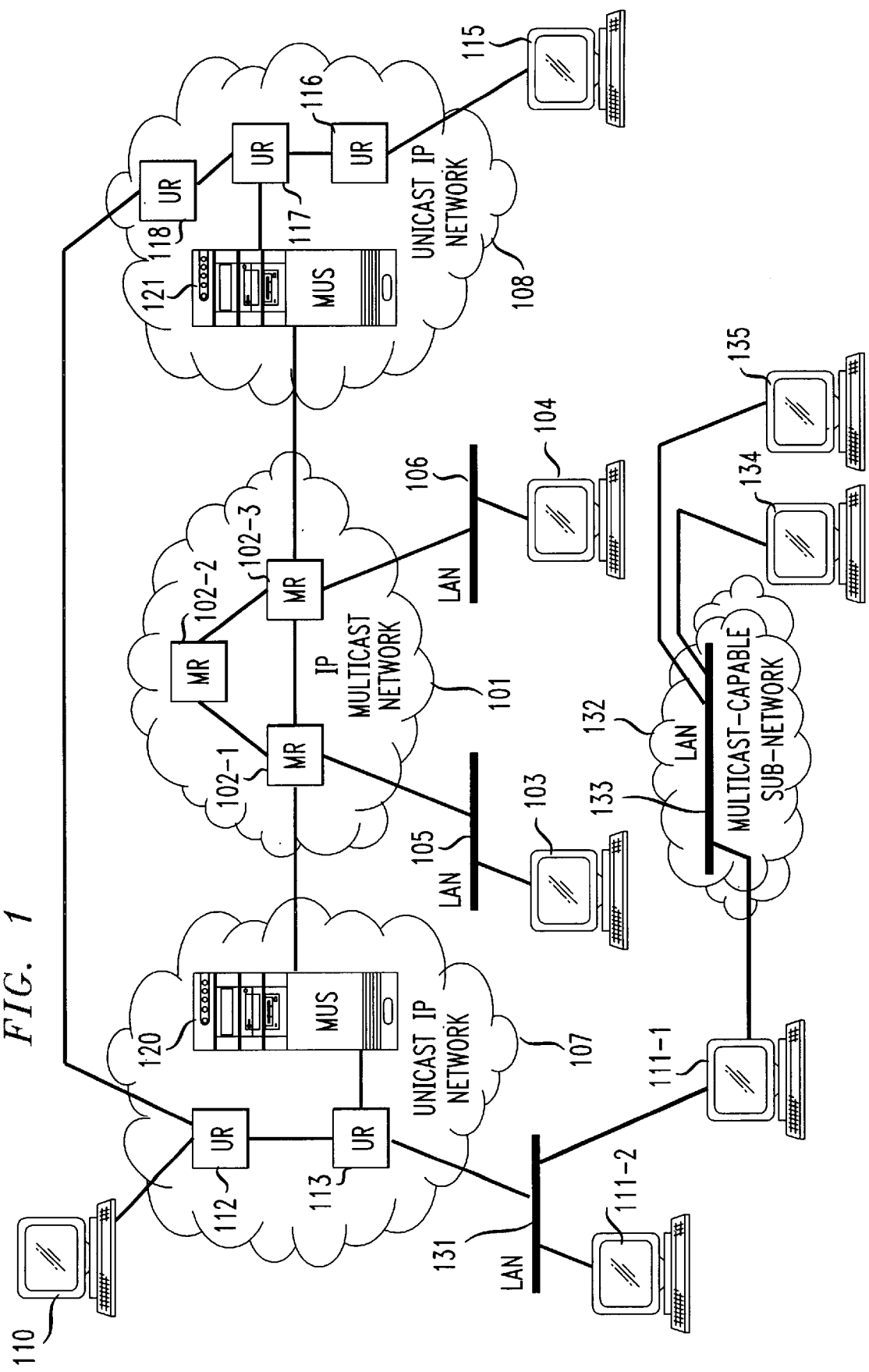
FIG. 1 is a block diagram showing clients connected on a Unicast Internet Protocol (IP) network accessing an IP Multicast network through Multicast-Unicast Servers (MUSes) and acting as a re-Multicaster to other clients connected on the same sub-network.

With reference to FIG. 1, an IP Multicast network 101 is shown including, as way of illustration, three interconnected Multicast Routers (MR) 102-1, 102-2, and 102-3. A well known currently in place IP Multicast network is the so-called MBONE (Multicast Backbone), which is a public shared IP Multicast network spanning many countries and covering thousands of IP sub-networks. In addition to the MBONE, numerous private Intranets also use Multicast IP for intra-corporate communications. A plurality of multimedia client terminals are connected to IP Multicast network 101, for example the MBONE. For way of illustration only, in FIG. 1 two client terminals 103 and 104 are shown connected to network 101 through respective Local Area Networks (LANs) 105 and 106, respectively. Each LAN is connected through a customer premises router (not shown) over, for example, a T1 line, Frame Relay (FR), ATM, or an X.25 connection. In accordance with Multicast communication, a sender of information of a particular media type transmits packets of information to a particular address, which are then automatically distributed to each of the members of a group that have requested to receive from that address. Advantageously, the network performs the replication functions necessary so that each receiver client of the group can receive the packets transmitted to the address by a sender or senders.

As described in the aforenoted co-pending patent application, which has been incorporated herein, a client terminal connected to a Unicast IP network is capable of joining in and participating with a Multicast session on an IP Multicast network. FIG. 1 shows two Unicast IP networks 107 and 108. Illustrative client terminal 110 is connected to network 107 through a conventional Unicast Router (UR) 112. Client terminals 111-1 and 111-2 are connected to a Local Area Network (LAN) 131, which in turn is connected to a conventional UR 113 within network 107. Another client terminal 115 is connected to UR 116 within network 108. UR 116 in turn is shown connected to another UR, UR 117 for example, which in turn is connected to UR 118. Networks 107 and 108 are shown as being interconnected through UR 112 and 118, thus enabling Unicast IP communication between a client terminal connected to Unicast IP network 107 and a client terminal connected to Unicast IP network 108. The client terminals 110 and 115, for example, can be connected to networks 107 or 108 over a Plain Old Telephone Service (POTS) dial-up connection, an ISDN connection or an Asynchronous Digital Subscriber Loop (ADSL) connection, each to a Local Exchange Carrier (LEC) (not shown) and from there to an Internet Service Provider (ISP) (not shown), which in turn is connected to the Unicast IP network through a Unicast Router. Alternatively, a client terminal can be connected to an ISP through a cable modem over cable facilities through a cable TV provider. As shown, the client terminals 111-1 and 111-2 are connected to a LAN 131 and to a customer premises router (not shown) to UR 113 over, for example, a Wide Area Network (WAN), T1 facilities, Frame Relay, ATM, or X.25. Client terminals 110, 111-1, 111-2, 115, for example, on Unicast IP networks 107 and 108, are able to participate in a Multicast IP session on IP Multicast network 101. Specifically, such functionality is enabled through Multicast-Unicast Servers (MUSes), such as MUS 120 in network 107 and MUS 121 in network 108, which each interconnect their respective Unicast IP networks 107 and 108, with the IP Multicast Network 101.

The Multicast-Unicast Servers 120 and 121 function as gateways that enable those Unicast-connected clients on their respective Unicast IP networks to access IP Multicast network 101. Specifically, each MUS through interaction with client software on the client on the Unicast IP network enables such client to join a group on the IP Multicast network by providing information relating to what sessions are in progress or scheduled on network 101. The MUS then receives and sends data on those groups within a session selected by client on behalf of the client. Thus, the MUS functions to convert the address of the Multicast IP packets of a requested-for group to the Unicast IP endpoint address of the requesting client. Furthermore, the MUS functions to transmit packets it receives from the endpoint client to a list of any other endpoint receivers for the requested-for Multicast group on the same Unicast IP network or an interconnected Unicast IP network (107 or 108), as well as to the Multicast group address itself on the IP Multicast network 101 to enable the Multicast endpoints, 103 and 104, for example, connected on that network to receive packets originating from the Unicast client.

As shown in FIG. 1, endpoint client 111-1 is shown also connected to a separate Multicast-capable sub-network 132. Such a Multicast-capable sub-network is a sub-network on which Multicast packets can be sent and received. With respect to receiving packets, Multicast packets can be generated locally on the sub-networkor from another Multicast-capable sub-network through a router. As shown in FIG. 1, Multicast-capable sub-network 132 illustratively is a LAN 133 to which client terminal 134 and 135 are connected.

In accordance with the present invention, once client terminal 111-1 connected to Unicast network 107, has joined a Multicast session on IP Multicast network 101 and commenced receiving and/or transmitting packets on that Multicast session through MUS 120 through the methodology described in the aforenoted co-pending application, that same client terminal 111-1 can function as a re-Multicaster of those packets it receives to other client terminals which thereafter indicate a desire to also join that same session. Client terminal 111-1 thus assumes the function of the MUS to re-distribute those packets to other requesting client terminals connected to the same sub-network to which client terminal 111-1 is connected (i.e., LAN 131), such as client terminal 111-2, and those client terminals connected to any Multicast-capable sub-network to which it is directly attached, such as client terminals 134 and 135 on LAN 133. Thus, as shown in FIG. 1 for the client terminals illustrated, client terminal 111-1 can redistribute the packets it receives from MUS 120 to any of client terminals 111-2, 134 and 135, if such client terminal requests to join the session on which client terminal 111-1 is already receiving packets. Therefore, if any of these clients wants to join such an ongoing session, a separate data stream need not be established from such requesting client to MUS 120. A more efficient use of digital facilities can thus be effected since replicas of the Unicast packets of the desired session do not have to be transmitted by MUS 120 separately to each requesting endpoint client terminal.

Figure 2:
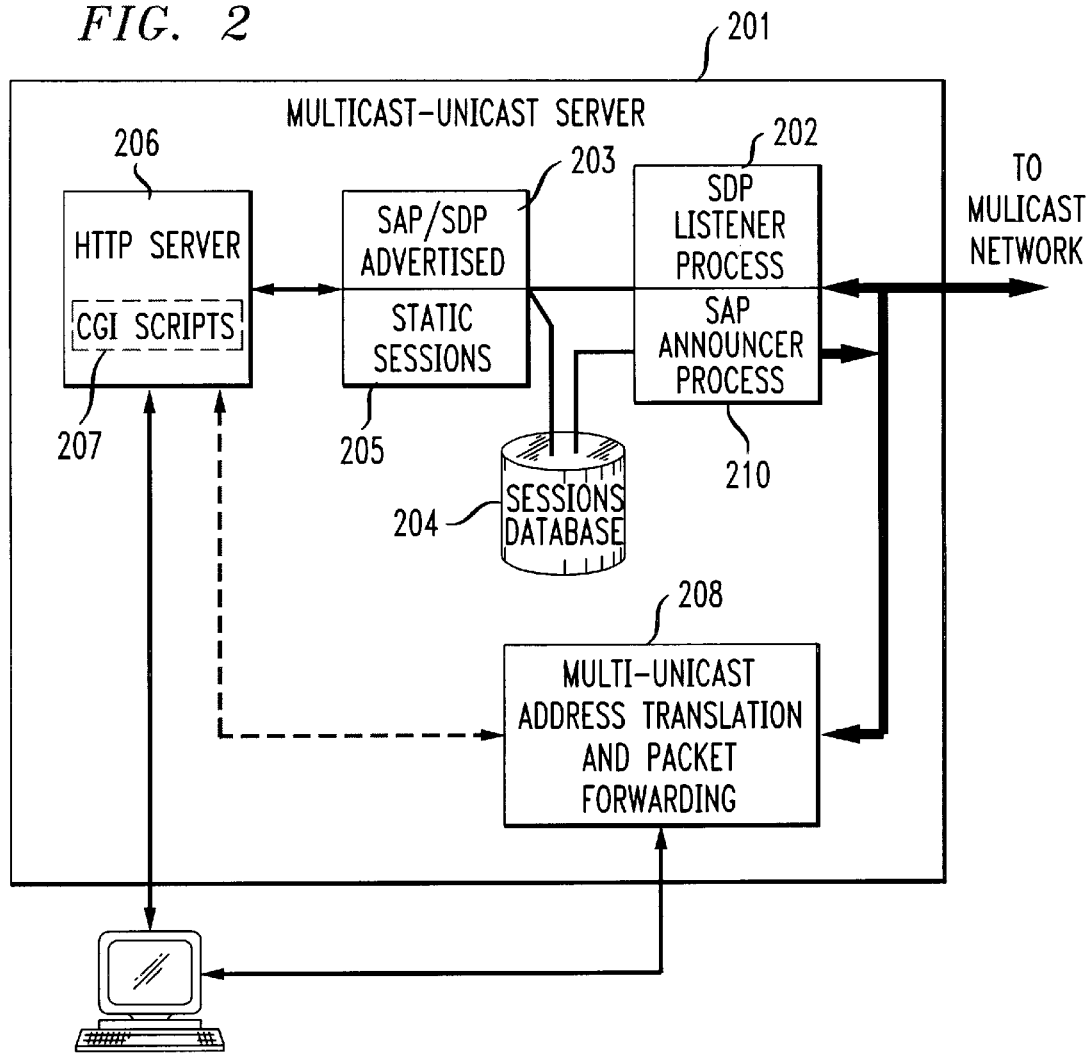
FIG. 2 is a block diagram of a MUS.
Figure 3:
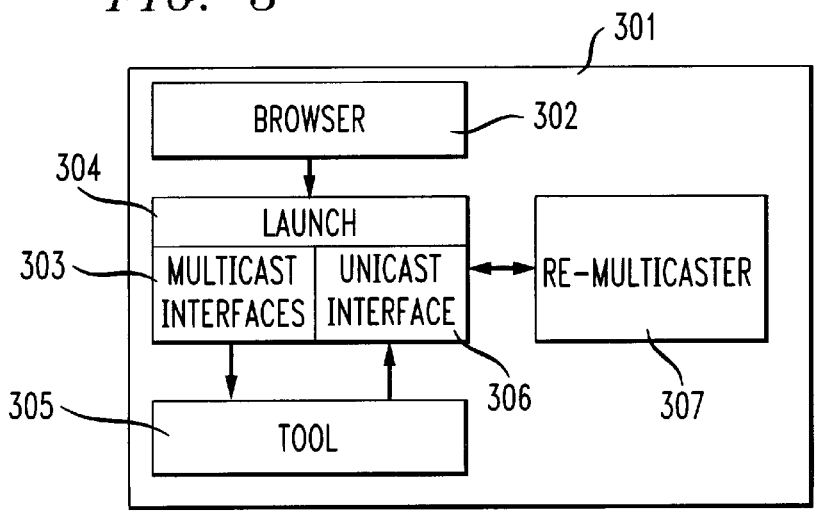
FIG. 3 shows the software components of a re-Multicasting client terminal that enable the client to access a Multicast session and redistribute that session to other endpoints on a sub-network on which that re-Multicasting client terminal is connected.

FIG. 2 is a block diagram of a MUS 201 that functions to forward and receive Multicast packets to and from a Unicast endpoint client terminal in the manner described in the aforenoted patent application. FIG. 3 is a block diagram of a endpoint client terminal 301 that can function to both join a session through the MUS 201 as described in the aforenoted patent application, join a session by receiving packets that are being re-Multicast by another client terminal, or function itself as a re-Multicaster of packets received from the MUS. With reference to FIG. 2, a Session Description Protocol (SDP) listener process 202 coupled to the IP Multicast network 101 listens for session announcements transmitted on Multicast network 101. Such directory announcements are repeatedly sent over the IP Multicast network 101. These "advertised" sessions are received by the SDP listener process 203 and stored in a sessions database 204. Other sessions that are not announced and thus not received by the SDP listener process 202, are entered by a system administrator through a static sessions process 205 and also stored in sessions database 204. An example of the latter might be a weather channel that is always present on a predetermined socket and is not repeatedly announced over the IP Multicast network 101.

An HTTP server 206 can read the sessions database 204 so that when a client connects to the server, the client is able to receive a listing of those Multicast sessions presently on the IP Multicast network 101. When the client connects to the server 206, the server executes CGI (Common Gateway Interface) scripts 207 within the HTTP server 206 on behalf of the client to present the information pertaining to the sessions to the client. Such information is presented back to the client 301 (FIG. 3) through its web browser program 302 (in FIG. 3). The client initiates a request to join a session by selecting a URL on an HTML web page presented to it by HTTP server 206. A message is thus sent from the client 301 by web browser 302, which when received by server HTTP 206 causes it to invoke certain actions. Specifically, HTTP server 206 sends a response back to the client comprising a control message containing information indicating what tool needs to be used in order to join the selected session. Such tools are well known in the art and may include, for example, the Visual Audio Tool (VAT), the Visual Conference Tool (VIC), or the Internet Protocol Television Tool (IPTV). Furthermore, the message indicates where the tools should be connected, i.e., specifically, to which Multicast sockets the session should be searched for, or alternatively, if the session cannot be found on the specified Multicast sockets, the Unicast socket on the MUS to which the tool should be connected. On the client side (in FIG. 3), the client 301 senses all of its own Multicast capable interfaces 303 on the local machine to see if packets for that session are available for reception from any sub-network to which it is attached. If they are, the program launches appropriate multimedia browsing tools on the corresponding socket and interface where the desired session was sensed. If packets for the desired session are not available from any sub-network, then client 301 launches via launch program 304 and its Unicast interface 306, the specified tool or tools 305 to the sockets on the MUS on which the Unicast address-translated packets for the Multicast session will be found. In the latter case, CGI scripts program 207 then initiates the translation/packet-forwarding server 208 within MUS 201 to join the requested Multicast group or groups (one group per selected media type) associated with the selected session. CGI scripts 207 that initiated such join action to take place then adds that client's Unicast address to a list of receivers for the requested Multicast group or groups. Server 208 then forwards Multicast packets received from the client to the list of receivers for each joined group and translates the Multicast address of packets received from the joined group to the Unicast address of the joining client.

A client terminal, after joining a session through the MUS, may elect to be a re-Multicaster of the session packets on any of its locally connected Multicast-capable sub-networks via a re-Multicasting function 307. The client will be permitted to re-Multicast if there are no other active re-Multicasters for that session on any of its local sub-networks. Furthermore, there should be no Multicast routers capable of forwarding the Multicast session onto any of its local sub-networks. If a Multicast router starts to forward IP Multicast packets from that session on the sub-network that the re-Multicasting client is functioning, this event will be detected by the re-Multicasting client, which will then cease its re-Multicasting operation. This could happen if the Multicast router on the local sub-network, becomes disconnected from the Multicast distribution tree due to, for example, a routing error. Such routing error, when corrected, will then enable the Multicast router to commence forwarding Multicast packets again.

In order to prevent potential multiple re-Multicasters on a sub-network from simultaneously re-Multicasting a session, a special Multicast group is defined called the "all re-Multicaster address", denoted $M_R$. All candidate re-Multicasters transmit "I am active" messages at regular intervals (e.g., one or two seconds apart) on that address $M_R$. The messages contain the list of Multicast addresses that the re-Multicaster is volunteering to re-Multicast. For each address in the group of addresses that the re-Multicaster is volunteering to re-Multicaster, each re-Multicaster keeps track of the source IP addresses associated with the "I am active" messages, and only the re-Multicaster with the lowest IP address is allowed to actually re-Multicast packets from a particular session.

In order to prevent a re-Multicaster and a router on the same sub-network from simultaneously forwarding packets from the same session, each re-Multicaster must keep track of the source address A of any Multicast router on the local sub-network that functions as the "Querier" per the Internet Group Management Protocol (IGMP) specification. The IGMP is used for communicating between a host and Multicast routers to indicate from which sessions the host wants to start or stop receiving packets. In the process of using IGMP, there could be one or more Multicast routers on a given sub-network. If there is only one, it is defined as the "Querier", whose job it is to send out query messages in order to determine which clients are interested in receiving what sessions. If the number of Multicast routers is greater than one, the routers follow an election process to identify which is the Querier. With reference to the present invention, during the course of re-Multicasting, the re-Multicaster must also listen for packets on the re-Multicasting group address. If any packets are received on the address having a source address A, then the Multicast router is forwarding packets onto the re-Multicast group address, and the re-Multicaster must stop its re-Multicasting function.

Figure 4A:
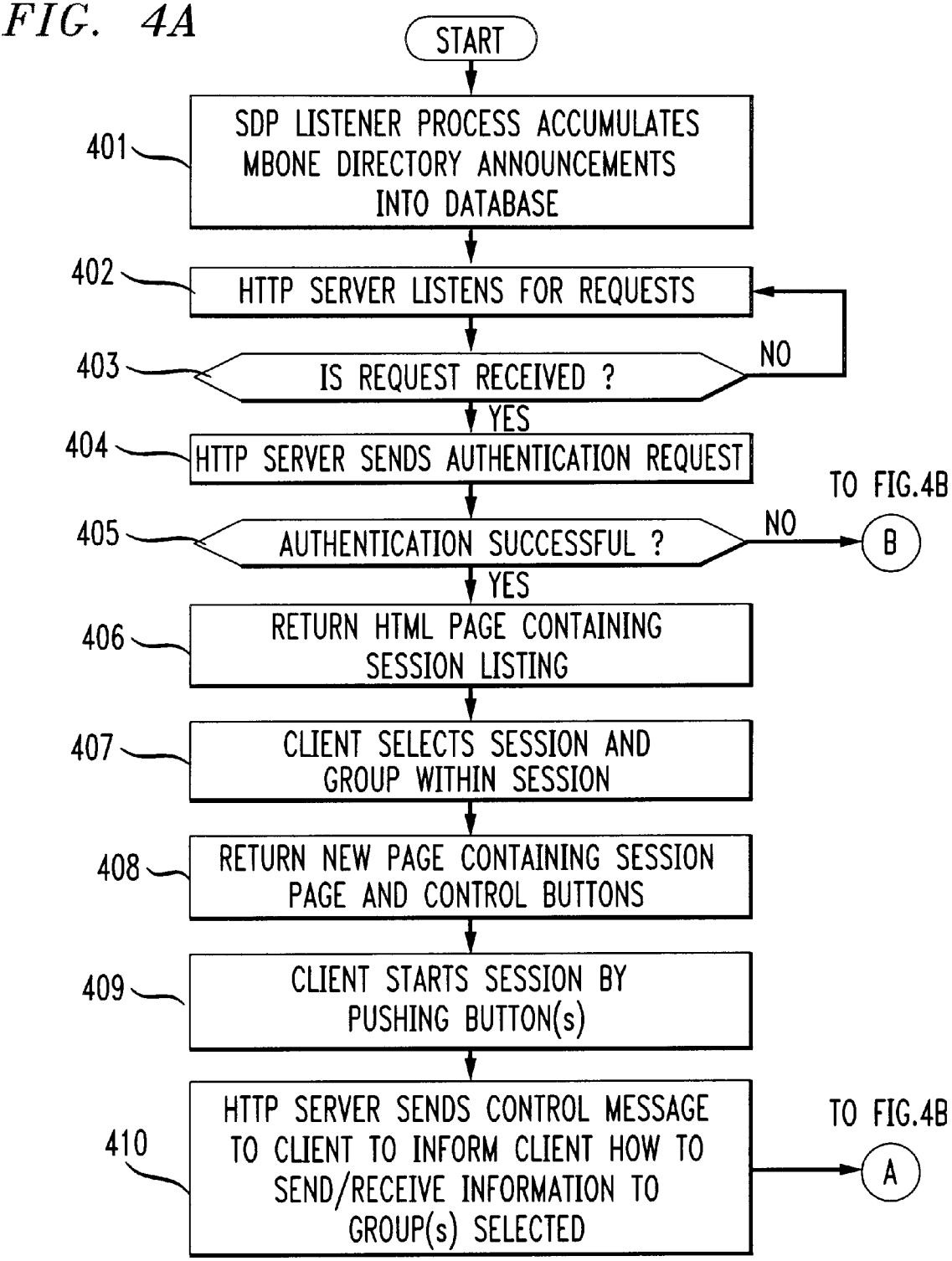
FIGS. 4A and 4B together are a flowchart detailing the steps associated with a Unicast client joining a Multicast session on the Multicast network.
Figure 4B:
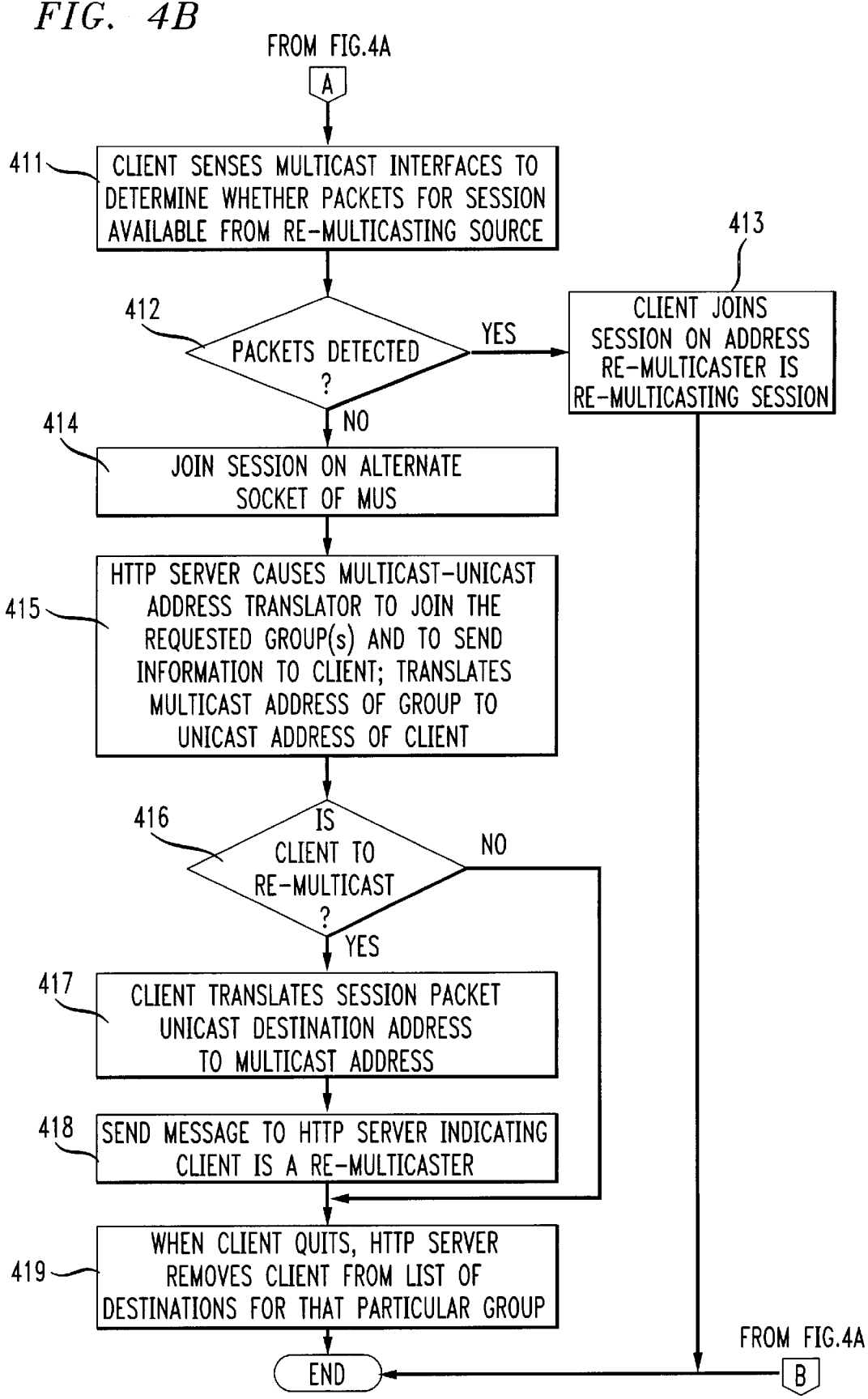

The steps associated with a client joining a session are detailed with reference to the flowchart in FIGS. 4A and 4B. At step 401, the SDP listener process accumulates IP Multicast network 101 directory announcements into database 204. The database is filtered and converted into a standard HTML page, where each URL points to information pertaining to each Multicast session in the filtered database. At step 402, the HTTP server 206 listens for requests for Multicast sessions/URLs on the HTML page which contains a list of URLs describing the sessions. At step 403, a request is received from a client for a copy of the page containing the Multicast sessions. At step 404, the HTTP server 206 sends a message back to the client requesting the user enter a login id and a password for authentication purposes. If the user is successfully authenticated at step 405, at step 406, server 206 returns a page to the client containing a list of sessions. When, at step 407, the user of the client browses the page and requests a session indicated by a URL, at step 408, server 206 returns a page containing details of the session and buttons enabling the client to request the session to start, as well as other functions to be described later herein. At step 409, the client starts a selected session (or specific media in the session) by "pressing" a button on the HTML page. The server 206 then launches a control script 207. At step 410, the control script 207 sends a response to the client containing information about which multimedia tool to launch, and what UDP sockets (the Unicast IP address on the MUS and associated ports) to listen to and to send information to corresponding to the requested session. At step 411 the client senses its Multicast interfaces 303 on the local machine to see if packets for that session are available for reception from any sub-network to which it is attached. At decision step 412, if such packets for the requested session are sensed, then at step 413 the client joins the session at the address on which the re-Multicasting client is re-Multicasting the session. This address is likely to be the Multicast IP address of the original Multicast session on the Multicast network. Appropriate multimedia browsing tools are launched on the corresponding socket and interface where the desired session was sensed for addresses of the selected. If packets for the requested session are not sensed at decision step 412 by the Multicast interface, then, at step 414, the client connects to an alternate socket of the MUS to join the session as per the procedures described in the aforenoted incorporated patent application. Specifically, at step 415 the control script 207 of server 206 causes the MUS gateway to join the requested-for Multicast session and adds the requesting client to the list of receivers for the requested for Multicast session. For each requesting client, server 206 also converts the address of the Multicast IP packets of the requested-for session to the Unicast IP address of the requesting client, and sends the Unicast IP packets to the requesting client using the well-known User Datagram Protocol (UDP). Server 206 also transmits any packets it receives from the client to any other Unicast client on that Multicast group, as well as to the Multicast group address itself on the IP Multicast network 101. At step 416, the decision is made whether the client is to re-Multicast. If yes, at step 417, the client translates the session packets destination field from the client's address to the original Multicast address of the group. At step 418, the client sends a message to the HTTP server 206 indicating the client is a re-Multicaster. At step 419, when the client exits from the multimedia tool, whether or not having acted as a re-Multicaster, HTTP server 206 detects that status messages from the client are no longer being sent and removes the client from the list of destinations for the particular Multicast group.

Figure 5:
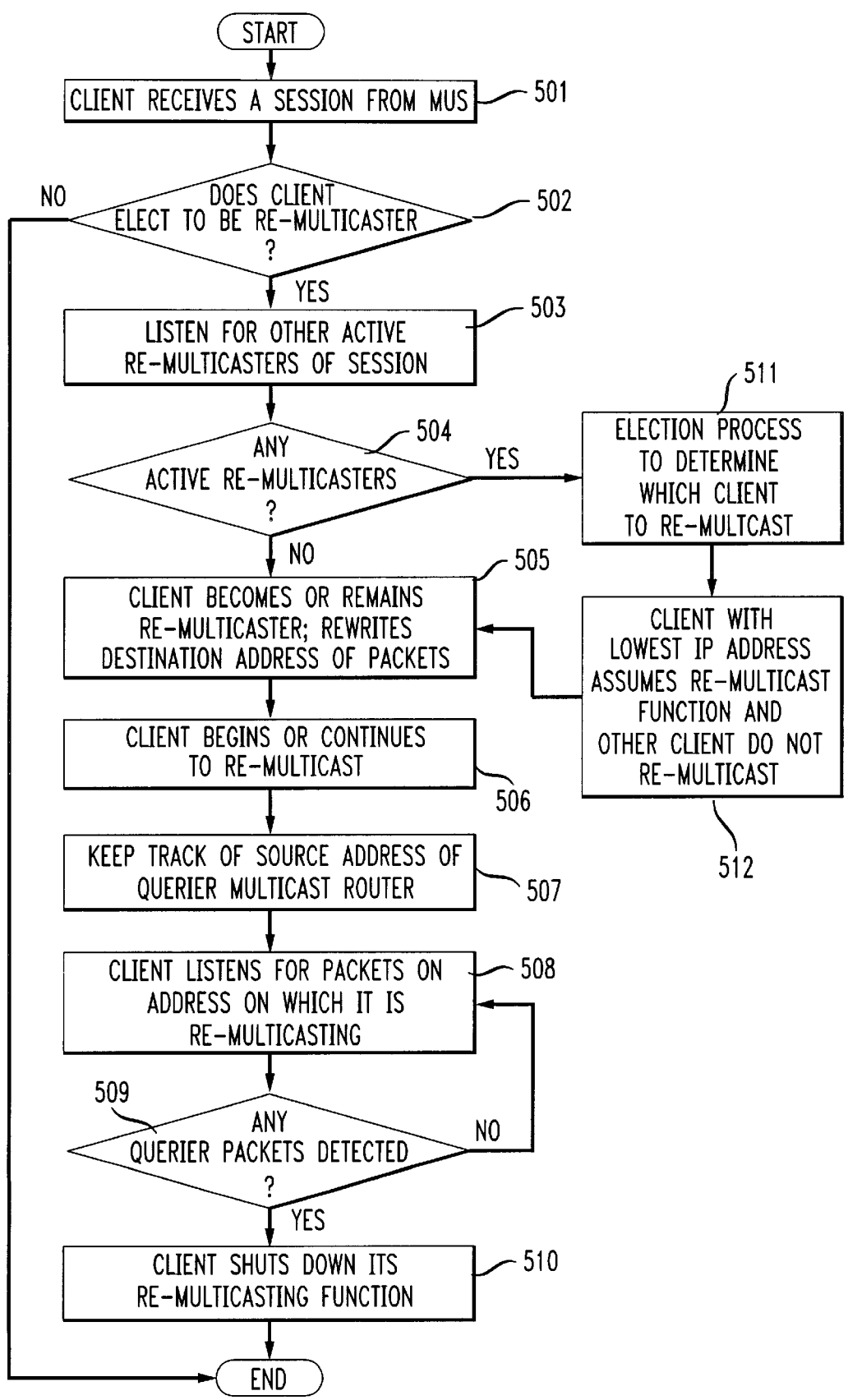
FIG. 5 is a flowchart detailing the steps of a how a client becomes a re-Multicaster of a session.

The steps associated with how a client become a re-Multicaster are detailed in FIG. 5. At step 501, the client receives a session from the MUS. At decision step 502, the client makes an election whether or not to be re-Multicaster. If it elects not to be a re-Multicaster because, for example, it knows that it will be connected to the session for only a short period of time, the process ends. If it elects to act as a re-Multicaster, at step 503, it listens for any other active re-Multicasters of the session. Decision step 504 determines whether there are any other active re-Multicasters of the session. If there are no other active re-Multicasters, at step 505, the client becomes a re-Multicaster, as described hereinabove, by rewriting the destination address of the received packets to the Multicast address of the session. At step 506, the client then begins to re-Multicast the received packets for the session. At step 507, it keeps track of the source address of the Querier Multicast router on the local sub-network to which it is connected, if there is one. At step 508 the client listens for packets on the address on which it is re-Multicasting. At step 509, the client determines whether it sees any packets from the Querier. If it does not, it continues to listen. If it does see any such packets, at step 510, it shuts itself down as a re-Multicaster. Back at decision step 504, if any other active re-Multicasters are detected, an election process is initiated, at step 511, to determine whether the client is to be the re-Multicaster or the other active client is to be the re-Multicaster. At step 512, if the client has a lower IP address than the other active re-Multicaster, the client becomes the re-Multicaster of the session, and the process proceeds to steps 505 et seq., as previously described, and the other active re-Multicasters do not re-Multicast the session. If the IP address of already active re-Multicaster is lower than that of the client, then the client does not become a re-Multicaster until such time as the active re-Multicaster ceases its re-Multicasting function.

Although described in connection with IP endpoint clients connecting to an IP Multicast network 101 such as the MBONE, the present invention could be employed with any IP Multicast network. Further the present invention could be employed with any Multicast network and Unicast network that operate in a similar fashion to IP Multicast and Unicast networks.

The above-described embodiments are illustrative of the principles of the present invention. Other embodiments could be devised by those skilled in the art without departing from the spirit and scope of the present invention.

The invention claimed is:

1. A method of providing access to a Multicast session on a Multicast network to a requesting client connected to the same sub-network as a client on a Unicast network or to a Multicast-capable sub-network directly connected to the client on the Unicast network, the method comprising the steps of:
   receiving at a gateway server packets from the Multicast session on a Multicast address;
   re-addressing at the gateway server the Multicast address of the packets from the session to a Unicast address of the client on the Unicast network;
   sending the re-addressed packets to the client on the Unicast network;
   re-re-addressing the packets received by the client on the Unicast network with a Multicast address; and
   re-Multicasting the re-re-addressed packets to the requesting client.

2. The method of claim 1 wherein the re-re-addressed packets are addressed with the same Multicast address on which they were received at the gateway server.

3. A method for a first client on a Unicast network, which is receiving Unicast-addressed packets from a Multicast session on a Multicast network from a gateway server, to provide the packets to another client on a same sub-network as the first client is connected on the Unicast network or to another client on a Multicast-capable sub-network directly connected to the first, the method comprising the steps of:
   re-addressing the received packets with a Multicast address; and
   re-Multicasting the re-addressed packets on the same sub-network and/or on the directly connected Multicast-capable sub-network.

4. The method of claim 3 wherein the received packets are re-addressed with a Multicast address that is a Multicast address for the session on the Multicast network.

5. The method of claim 3 further comprising the steps of:
   determining whether a second client connected on the same sub-network as the first client or on the directly Multicast-capable sub-network is re-Multicasting packets from the session; and if the second client is re-Multicasting packets from the session, determining whether the first or the second client is to re-Multicast the packets from the session.

6. The method of claim 5 further comprising the step of:

if the step of determining whether the first or second client is to re-Multicast determines that the first client will re-Multicast, halting re-Multicasting of the packets by the second client.

7. The method of claim 5 further comprising the step of:

if the step of determining whether the first or second client is to re-Multicast determines that the second client will re-Multicast, inhibiting the step by the first client of re-Multicasting the packets.

8. The method of claim 5 wherein the step of determining whether the first or second client is to re-Multicast comprises the step of determining which client has a lower IP address.

9. The method of claim 3 further comprising the steps of:

determining whether a router is distributing packets from the session on the locally connected sub-network; and if it is determined that a router is distributing packets, inhibiting the first client from re-Multicasting packets from the session.

10. The method of claim 9 wherein the step of determining whether a router is distributing packets comprises listening for packets on a Multicast address on which the session is Multicast.

11. The method of claim 9 wherein the first client is inhibited from re-Multicasting packets only when the router is distributing packets from the session and the first client resumes re-Multicasting packets when it is determined that the router is not distributing packets from the session.

12. A method for a first client on a Unicast network, which is receiving Unicast-addressed packets from a Multicast session on a Multicast network from a gateway server, the method comprising the step of:

re-Multicasting the received packets to another client on a same sub-network on the Unicast network on which the first client is connected or on a Multicast-capable sub-network directly connect to the first client.

13. The method of claim 12 wherein these step of re-Multicasting comprises the step of:

re-addressing the received packets with a Multicast address.

14. The method of claim 13 wherein the received packets are re-addressed with a Multicast address that is a Multicast address for the session on the Multicast network.

15. The method of claim 13 further comprising the steps of:

determining whether a second client connected on the same sub-network as the first client or on the directly Multicast-capable sub-network is re-Multicasting packets from the session; and if the second client is re-Multicasting packets from the session, determining whether the first or the second client is to re-Multicast the packets from the session.

16. The method of claim 15 further comprising the step of:

if the step of determining whether the first or second client is to re-Multicast determines that the first client will re-Multicast, halting re-Multicasting of the packets by the second client.

17. The method of claim 15 further comprising the step of:

if the step of determining whether the first or second client is to re-Multicast determines that the second client will re-Multicast, inhibiting the step by the first client of re-Multicasting the packets.

18. The method of claim 15 wherein the step of determining whether the first or second client is to re-Multicast comprises the step of determining which client has a lower IP address.

19. The method of claim 13 further comprising the steps of:

determining whether a router is distributing packets from the session on the locally connected sub-network; and if it is determined that a router is distributing packets, inhibiting the first client from re-Multicasting packets from the session.

20. The method of claim 19 wherein the step of determining whether a router is distributing packets comprises listening for packets on a Multicast address on which the session is Multicast.

21. The method of claim 19 wherein the first client is inhibited from re-Multicasting packets only when the router is distributing packets from the session and the first client resumes re-Multicasting packets when it is determined that the router is not distributing packets from the session.

* * * * *